April 28, 1942. F. NALLINGER 2,280,839
INTERNAL COMBUSTION ENGINE
Filed Jan. 28, 1938
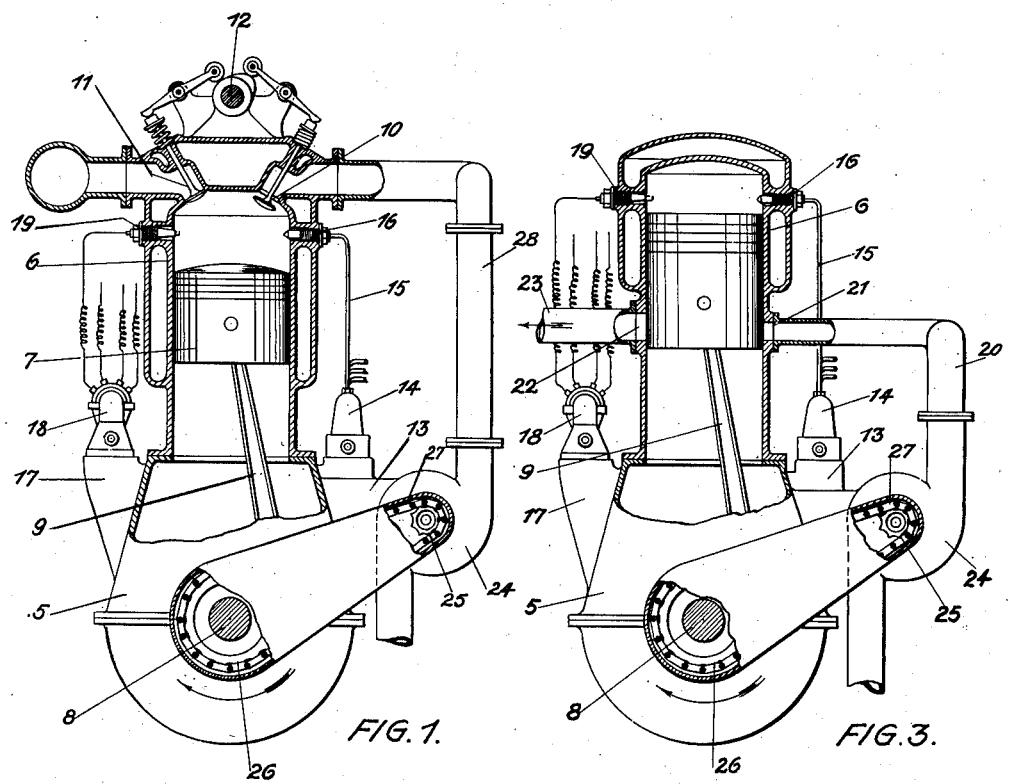
FIG. 1.
FIG. 3.
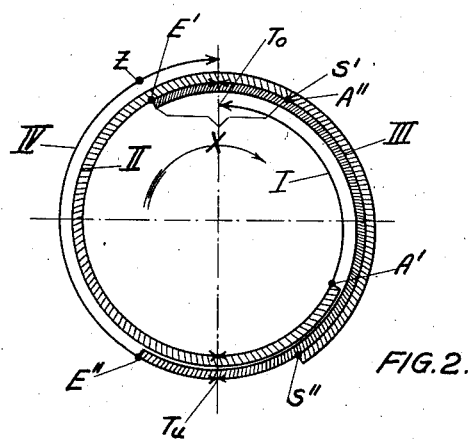
FIG. 2.
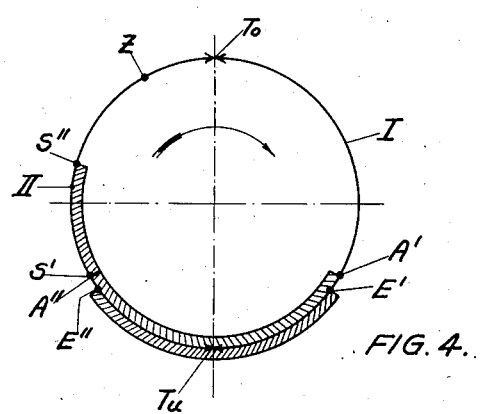
FIG. 4.
Inventor:

Patented Apr. 28, 1942

2,280,839

UNITED STATES PATENT OFFICE 2,280,839

INTERNAL COMBUSTION ENGINE

Fritz Nallinger, Stuttgart, Germany, assignor to Daimler-Benz Aktiengesellschaft, Untertürkheim-Stuttgart, Germany, a company of Germany Application January 28, 1938, Serial No. 187,394
In Germany January 30, 1937

4 Claims. (Cl. 123—32)

The present invention relates to improvements in internal combustion engines and is concerned with engines wherein a fuel, for example gasoline, which preferably is light and ignites below the pressure of self-ignition, is injected directly into the cylinder space or into a separate space in communication therewith, or into the passage in front of the inlet valve, and is ignited by a timed electric spark.

In an engine in accordance with the invention, the closure members for the inlet and exhaust openings and the injection device are so controlled that the exhaust and inlet periods considerably overlap and the fuel is only injected immediately before the closure, at the closure, or more or less after the closure of the exhaust opening. This arrangement results in a surprising increase of output, even with a reduction in specific fuel consumption. An overlap of between 40 to 140°, referred to the crank diagram, has proved particularly favourable in connection with four and two stroke engines alike. This effect is to be ascribed to the fact that the residual gases are effectively scavenged out from the space remaining above the upper dead-centre position of the piston by pure fresh air, and a mixture of air and fuel only takes place after this scavenging action. In this, it is assumed that the air is supplied by a blower, but the mode of working can also be carried into effect with an engine without a blower. The improvements are applicable equally to internal combustion engines operating on either the four-stroke or two-stroke principle.

In the annexed drawing:

Fig. 1 is a sectional elevation of a four-stroke engine,

Fig. 2 is a control diagram for the four-stroke engine,

Fig. 3 is a sectional elevation of a two-stroke engine, and

Fig. 4 is a control diagram for the two-stroke engine.

In the four-stroke engine illustrated in Fig. 1, there is mounted upon the crank case 5 the normally constructed water-cooled cylinder 6 in which works a piston 7 connected with the crank shaft 8 by the connecting rod 9. The inlet and exhaust valves 10 and 11 disposed in the cylinder head are controlled from the over-head cam shaft 12. The fuel pump 14 from which the fuel is supplied to the injection nozzle 16 through a pipe 15 is mounted upon a bracket 13 on one side of the engine. The scavenging and charging air is compressed in the blower 24 which is driven from the crank shaft of the engine by means of sprockets 25, 26 and chain 27. The scavenging and charging air produced in the blower 24 is supplied to the inlet valve 10 through the duct 28. On the opposite side of the engine, the ignition-magneto apparatus 18 which supplies the ignition current for the ignition plug 19 is mounted on the bracket 17.

Fig. 2 is a diagram illustrating the timed control to be applied to the four-stroke engine. In this diagram, two complete revolutions of the crank shaft, corresponding to a complete four-stroke cycle, are represented in the form of a spiral wherein I corresponds to the working stroke, II to the scavenging stroke, III to the suction stroke and IV to the compression stroke. $T_o$ indicates in each case the upper dead centre and $T_u$ the lower dead centre of the working piston. A' indicates the opening and A'' the closing of the exhaust. Correspondingly, E' indicates the opening and E'' the closing of the inlet. The ignition by the jumping spark takes place at Z.

As Fig. 2 shows, the exhaust and inlet periods overlap in the range $x$ of the upper dead centre between the scavenging stroke II and the suction stroke III. At the instant at which the exhaust opening is closed at A'', the injection action commences at S' and terminates, for example, at S''. A good scavenging action is achieved by the overlap $x$. Loss of fuel is excluded by the late injection. The injection action may also commence later and terminate earlier or later than is indicated by Fig. 2. The limiting case for the commencement of the injection is given when the injection action takes place directly before the closure of the exhaust opening. To what extent this is possible without loss of fuel depends upon the nature of the scavenging process employed or upon what path the injected fuel particles, carried along by the scavenging air, have to follow from the injection nozzle to the exhaust opening. It is important that the fuel should no longer be able to pass through the opened exhaust opening into the exhaust pipe.

In the two-stroke engine illustrated in Fig. 3, the main parts are illustrated and indicated similarly to the four-stroke engine in Fig. 1. The scavenging air produced in the blower 24 is supplied through the passage 20 to the scavenging ports 21 which are disposed opposite to the exhaust ports 22. The exhaust and inlet are controlled by the piston in the usual fashion. The exhaust port 22 is somewhat wider than the inlet port 21 so that it opens earlier and closes later than the inlet 21. The exhaust pipe 23 is connected to the exhaust port 22.

The control actions of the two-stroke engine are indicated in the diagram, Fig. 4, on a circle corresponding to a complete revolution of the crank shaft. The exhaust and inlet periods A'—A'' and E'—E'' are controlled symmetrically in relation to the lower dead-centre T$u$ between the expansion stroke I and the compression stroke II. The fuel injection S'—S'' takes place after the closure of the exhaust opening and the ignition takes place at Z.

It is immaterial for the invention whether the opening and closing of the exhaust and the inlet openings is effected by the piston, by valves, by movable cylinder liners or by rotary valves and whether it is effected symmetrically or unsymmetrically in relation to the piston dead-centres. Also, within the scope of the invention, it is immaterial whether the scavenging is effected in accordance with the cross-current, counter-current, uni-directional current or reversing process.

I claim:

1. The method of controlling an internal combustion engine having a cylinder, a piston therein, and normally closed intake and exhaust passages respectively leading to and from said cylinder, which includes the following sequential steps: opening the exhaust passage, supplying air under pressure to said cylinder through said intake passage, closing said exhaust passage and substantially simultaneously beginning the injection of fuel into the cylinder, the overlap between the steps of supplying air under pressure to the cylinder and the closing of the exhaust passage covering a period equivalent to a range of 40° to 140° of crank angle; ceasing the injection of fuel; closing the intake passage and cutting off the supply of air under pressure; igniting the fuel in the cylinder.

2. In an internal combustion engine, in combination, a cylinder, a piston in said cylinder, inlet and exhaust passages in said cylinder, means for opening and closing said exhaust passage, means for supplying compressed air to said cylinder through said inlet passage before closure of said exhaust passage and the top dead-center position of said piston, the overlap between the supplying of compressed air to the cylinder and the closure of the exhaust passage covering a range of 40° to 140° of crank angle, thereby expelling any residual gases before the down stroke of the piston, means for injecting fuel into said cylinder substantially at the moment of closure of said exhaust passage, means for closing said inlet passage, and means for igniting the fuel in said cylinder.

3. In a four cycle internal combustion engine, in combination, a cylinder, a piston in said cylinder, inlet and exhaust passages for said cylinder, means for opening said exhaust passage near the end of the expansion stroke before the lower dead-center position of said piston, and closing it after the beginning of the air-inlet stroke after upper dead-center position of the piston, means for opening said inlet passage near the end of the exhaust stroke and before the upper dead-center position of the piston, and closing it after the beginning of the compression stroke after the lower dead-center position of the piston, the overlap between the opening of the inlet and closing of the exhaust covering a range of 40° to 140° of crank angle, means for injecting fuel into said cylinder substantially at the moment of closure of said exhaust passage and during most of the air-inlet stroke, and means for igniting said fuel during the compression stroke.

4. In an internal combustion engine, in combination, a cylinder, inlet and exhaust passages for said cylinder, means for opening and closing said exhaust passage, means for opening and closing said inlet passage, said inlet passage being opened before closure of said exhaust passage, the overlap between the opening of the inlet and the closing of the exhaust covering more than 110° of the crank angle, means for injecting fuel into said cylinder substantially at the moment of closure of said exhaust passage, and means for igniting the fuel in said cylinder.

FRITZ NALLINGER.